US009306779B2

(12) United States Patent
Swarup

(10) Patent No.: US 9,306,779 B2
(45) Date of Patent: Apr. 5, 2016

(54) CHAOTIC COMMUNICATION SYSTEMS AND METHODS

(71) Applicant: Ashitosh Swarup, Burbank, CA (US)

(72) Inventor: Ashitosh Swarup, Burbank, CA (US)

( * ) Notice: Subject to any disclaimer, the term of this patent is extended or adjusted under 35 U.S.C. 154(b) by 0 days.

(21) Appl. No.: 13/708,822

(22) Filed: Dec. 7, 2012

(65) Prior Publication Data

US 2014/0064410 A1   Mar. 6, 2014

Related U.S. Application Data

(60) Provisional application No. 61/568,037, filed on Dec. 7, 2011.

(51) Int. Cl.
| | |
|---|---|
| H04B 1/69 | (2011.01) |
| H04B 1/707 | (2011.01) |
| H04B 1/713 | (2011.01) |
| H04L 27/00 | (2006.01) |
| H04L 5/00 | (2006.01) |
| H04L 27/18 | (2006.01) |

(52) U.S. Cl.
CPC ............ *H04L 27/001* (2013.01); *H04L 5/0016* (2013.01); *H04L 27/18* (2013.01)

(58) Field of Classification Search
CPC ...... H04L 27/001; H04L 5/0016; H04L 27/18
USPC ......... 375/130, 140, 146, 147, 295, 316, 343; 370/342, 335, 320
See application file for complete search history.

(56) References Cited

U.S. PATENT DOCUMENTS

| | | | | |
|---|---|---|---|---|
| 8,406,352 | B2 * | 3/2013 | Michaels et al. | 375/343 |
| 2011/0002460 | A1 * | 1/2011 | Michaels et al. | 380/37 |
| 2012/0250783 | A1 * | 10/2012 | Terry | 375/295 |

* cited by examiner

*Primary Examiner* — Phuong Phu
(74) *Attorney, Agent, or Firm* — David R. Stevens; Stevens Law Group

(57) ABSTRACT

Example chaotic communication systems and methods are described. In one implementation, a method receives a portion of a chaotic waveform that has a temporal length. The method also receives a data signal for communication to a destination. A chaotic data signal is generated based on the received data signal. The chaotic data signal includes the chaotic waveform inserted at periodic intervals based on the temporal length of the chaotic waveform.

4 Claims, 11 Drawing Sheets

CHAOTIC COMMUNICATION SYSTEMS AND METHODS

RELATED APPLICATION

This application also claims the priority benefit of U.S. Provisional Application Ser. No. 61/568,037, entitled "Chaotic communication systems and methods", filed Dec. 7, 2011, the disclosure of which is incorporated by reference herein in its entirety.

STATEMENT REGARDING FEDERALLY-SPONSORED RESEARCH OR DEVELOPMENT

This invention was made with government support under Contract No. W15P7T-11-C-H203 awarded by the U.S. Army. The government has certain rights in the invention.

TECHNICAL FIELD

The present disclosure generally relates to communication systems and, in particular embodiments, to digital communication systems and methods using chaotic signals as modulating waveforms.

BACKGROUND

Various communication systems are available for communicating data between two locations. For example, spread-spectrum broadband digital communication systems have long offered several advantages over narrowband communication systems, including better immunity to noise, improved multipath rejection and, in the case of signals hidden in the noise floor, a low probability of intercept. Additionally, code division multiple access (CDMA) techniques allow multiple users to be supported on the same bandwidth. Typical applications of these digital communication techniques include cellular phones and the global positioning systems. However, these existing systems are often vulnerable to spoofing, jamming, and various techniques that may intercept the communicated signals.

DETAILED DESCRIPTION

Figure 1:
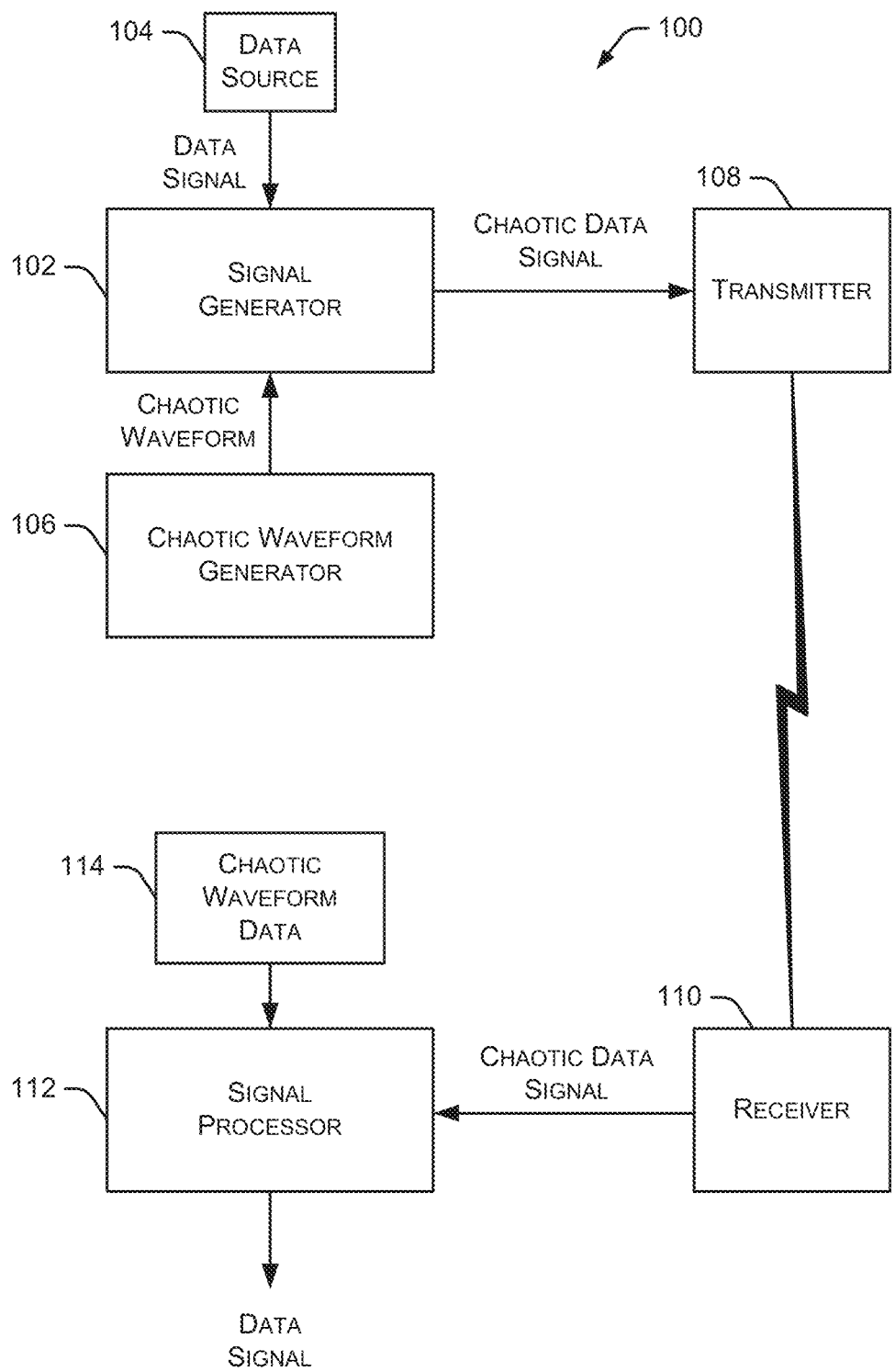
FIG. 1 illustrates an example chaotic communication system in accordance with an embodiment.

The systems and methods described herein use chaotic signals as modulating waveforms to communicate data to a destination. The chaotic signals replace, for example, conventional binary spreading codes as used in current spread-spectrum techniques. These described systems and methods use a slice of a chaotic waveform, sampling and quantizing it, and repeating it periodically. The chaotic sequence can be generated either a priori and stored in a file that can be read, or generated in real-time with a chaotic signal generator that uses, for example, the CORDIC (COordinate Rotation DIgital Computer) block in a programmable logic device, such as a FPGA (field programmable gate array).

Spread-spectrum broadband digital communication systems offer several advantages over narrowband communication systems, including better immunity to noise, improved multipath rejection and, in the case of signals hidden in the noise floor, a low probability of intercept. Further, code division multiple access (CDMA) techniques allow multiple users to be supported on the same bandwidth. Typical examples of these digital communication techniques are cellular phones and the Global Positioning System. These systems use binary spreading waveforms, and while they offer the advantages discussed above over narrowband communication systems, they still have their limitations—for example, a GPS (global positioning system) signal is vulnerable to spoofing. Further, carrier and code clock regeneration techniques take advantage of the binary modulation schemes and can be used to intercept these signals.

Example chaos-based digital communication schemes are described herein. Chaotic signals are deterministic, reproducible signals with the properties of noise. Chaotic signals are generated by nonlinear systems, either in the analog domain or digitally. These systems are very sensitive to initial conditions, with different temporal waveforms being produced by the same system with only a slight change in initial conditions. The frequency domain representation of these signals resembles noise spectra, and they display strong autocorrelation properties, with weak cross-correlations. These properties of chaotic signals make them very desirable for use in digital communication systems, since they offer several improvements over spread spectrum systems using binary modulation, such as lower probably of interception and better security.

The systems and methods described herein include one or more of the following features:

Uses a slice of a chaotic sequence that is sampled and quantized, and repeated periodically.

CORDIC block implementation of chaotic generator allows for real-time generation of chaotic sequence.

Does not need resynchronization signals to be sent periodically in case of loss of communication link.

Software-defined chaotic transmitter and receiver pair does not need specialized processing hardware.

Can be implemented using conventional clock generators; does not require a high-precision clock (e.g., GPS or atomic clocks) at either the transmitter or the receiver.

Capable of operating below the noise floor.

Secure communication system—signal or message cannot be decoded by anyone who does not have knowledge of the chaotic modulating signal.

High data rates.

Does not require or use a chaotic signal generator that runs indefinitely since the chaotic sequence is periodic.

FIG. 1 illustrates an example chaotic communication system 100, in accordance with an embodiment. As shown, a signal generator 102 receives a data signal from a data source 104, and receives a chaotic waveform from a chaotic waveform generator 106. In alternate embodiments, the chaotic waveform generator 106 is replaced with any system or device capable of providing a chaotic waveform to the signal generator 102. In some embodiments, the chaotic waveform generator 106 is a storage device that stores one or more chaotic waveforms (or portions of chaotic waveforms). The signal generator 102 generates a chaotic data signal, which includes the data signal as modulated by at least a portion of a chaotic waveform. In some embodiments, the chaotic data signal is generated by multiplying the data signal and the chaotic waveform. The chaotic data signal is provided to a transmitter 108, which transmits the chaotic data signal to a destination (e.g., a receiver 110 or other system at the destination).

The receiver 110 at the destination receives the chaotic data signal and provides the signal to a signal processor 112. The signal processor 112 extracts the data signal from the chaotic data signal based on the chaotic waveform data 114. The chaotic waveform data 114 used by the signal processor is the same as (or is a representation of) the chaotic waveform used by the signal generator 102 that generated the chaotic data signal (e.g., the chaotic waveform generated by chaotic waveform generator 106). The extracted data signal is then provided to another system or component for processing.

Figure 2:
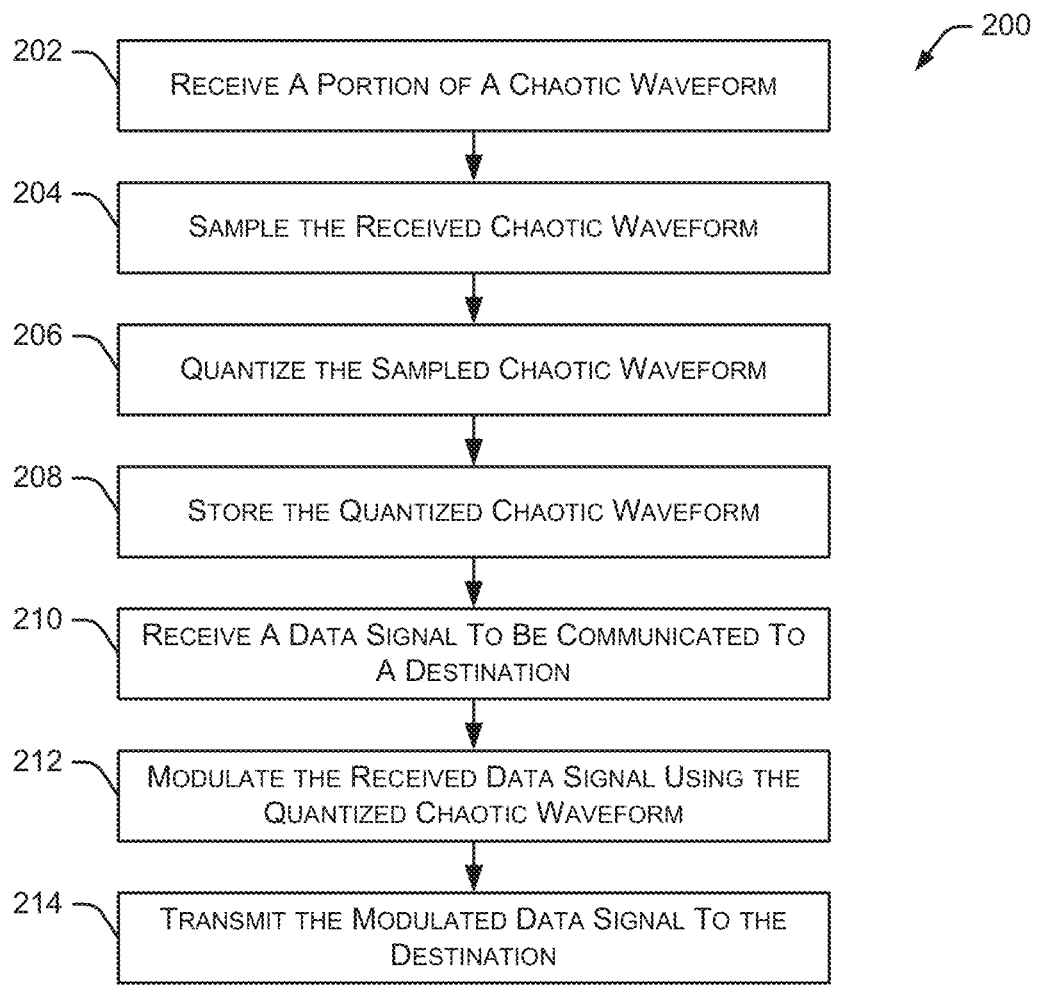
FIG. 2 is a flow diagram of a method, in accordance with an embodiment, for generating and transmitting a chaotic data signal.

FIG. 2 is a flow diagram of a method 200, in accordance with an embodiment, for generating and transmitting a chaotic data signal. The method 200 receives a portion of a chaotic waveform at 202 and samples the received chaotic waveform at 204. The sampled waveform is quantized at 206 and stored at 208 for future access by a signal generator or other component/system. Quantizing the waveform refers to the process of mapping a large set of input values to a smaller set, which is part of the waveform digitization process. This digitization process includes sampling the waveform in time and quantizing the waveform to account for the effects of the analog-to-digital converter, discussed herein. The method 200 then receives a data signal that is to be communicated to a destination (e.g., via a wireless communication link) at 210. The received data signal is modulated using the quantized chaotic waveform at 212 and the modulated data signal is transmitted to the destination at 214. Additional details regarding the generation and transmitting of chaotic data signals are provided herein.

Figure 3:
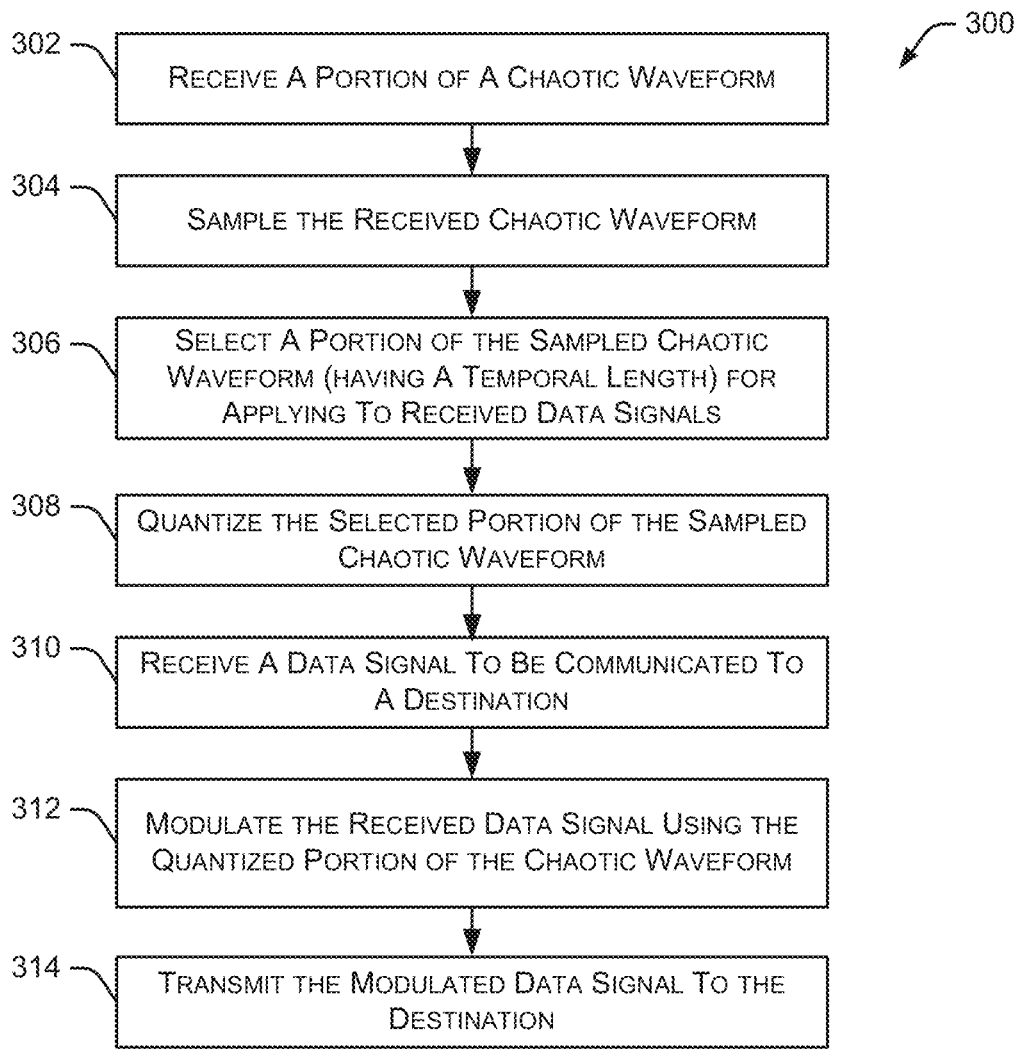
FIG. 3 is a flow diagram of another method, in accordance with an embodiment, for generating and transmitting a chaotic data signal.

FIG. 3 is a flow diagram of another method 300, in accordance with an embodiment, for generating and transmitting a chaotic data signal. The method 300 receives a portion of a chaotic waveform at 302 and samples the chaotic waveform at 304. A portion of the sampled chaotic waveform is selected at 306 for applying to received data signals. The selected portion of the sampled chaotic waveform has a temporal length (also referred to as a "periodic interval"). The method 300 continues by quantizing the selected portion of the sampled chaotic waveform at 308. The method 300 continues as a data signal is received at 310. The received data signal is to be communicated to a destination. The received data signal is modulated at 312 using the quantized portion of the chaotic waveform and the modulated data signal is transmitted to the destination at 314.

Figure 4:
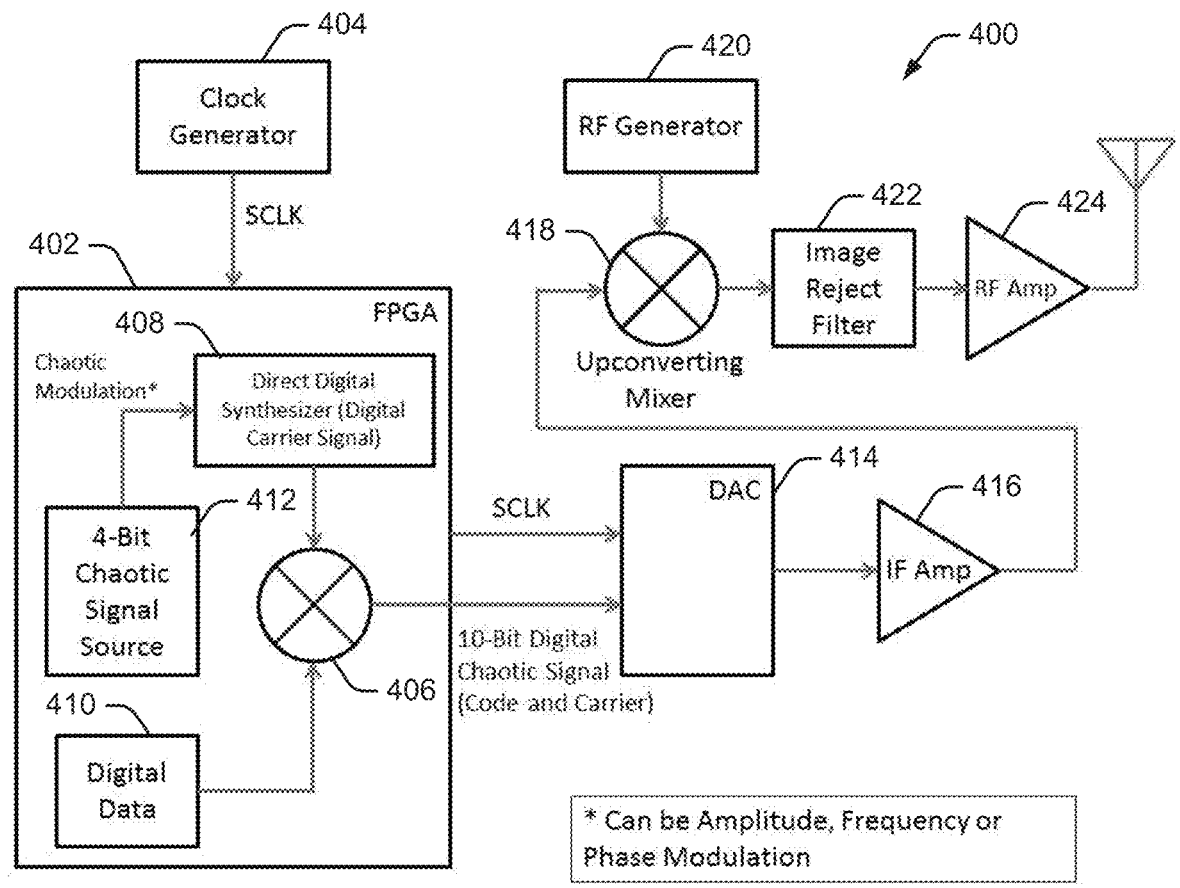
FIG. 4 is a block diagram of a chaotic signal transmitting system in accordance with an embodiment.

FIG. 4 is a block diagram of a chaotic signal transmitting system 400 in accordance with an embodiment. In the embodiment of FIG. 4, a FPGA 402 is coupled to a clock generator 404 that provides a clock signal to the FPGA 402. The FPGA 402 includes a digital multiplier 406 that receives signals from a direct digital synthesizer 408 and a digital data source 410. The FPGA 402 also includes a 4-bit chaotic signal source 412 that provides a chaotic signal to the direct digital synthesizer 408 to account for various modulation schemes, such as amplitude modulation, frequency modulation, and phase modulation. The output of digital multiplier 406 is a 10-bit digital chaotic signal including a code and a carrier. The 10-bit digital chaotic signal is provided to a DAC (digital-to-analog converter) 414. Additionally, the FPGA 402 communicates the clock signal received from the clock generator 404 to the DAC 414. The DAC 414 communicates the converted signal to an IF (intermediate frequency) amplifier 416, which communicates the amplified signal to an upconverting mixer 418. The upconverting mixer 418 receives a signal from an RF (radio frequency) generator 420. The output of the mixer 418 is communicated to an image reject filter 422. The output of image reject filter 422 is communicated to an RF amplifier 424, which amplifies the upconverted chaotic signal to provide the necessary signal power prior to RF transmission to a destination device.

An example implementation of the chaotic signal transmitting system 400 communicates wirelessly in the L-band (950-1950 MHz). In this example implementation, the clock generator 404 generates a master clock signal for the chaotic signal transmitting system 400. This master clock signal has a frequency of 52.0833 MHz. The FPGA 402 is the source of the digital chaotic signal. The 4-bit chaotic signal source 412 produces a digitized chaotic signal that clocks at one fourth the master clock rate (i.e., the clock signal generated by the clock generator 404). At a rate of four master clock samples per chaotic sequence sample, the resultant chaotic signal sequence rate is 13.028 MHz. Also, the chaotic sequence repeats every 125 samples, and assuming that the digital data modulates the chaotic signal at the repeat rate, this gives a resultant data rate of 104.167 kbps.

In the example implementation of chaotic amplitude modulation, the direct digital synthesizer generates an 8-bit wide digital carrier sine wave that multiplies the chaotic signal (chaotic amplitude modulation). The digital carrier sine wave has a frequency of 15 MHz. This signal upconverts the spectrum of the chaotic signal, and reduces the high-pass effects of the digital-to-analog converter on the chaotic signal, which is sampled and held. If the chaotic signal is directly input to the DAC, then the lower frequencies get distorted since the output of the DAC is transformer-coupled. This results in a nonlinear transient response in the flat portions of the chaotic signal. Upconverting the signal in the digital domain itself minimizes the effect of the DAC on the low frequency components of the signal. The output composite code-carrier digital data is 10-bit. However, the multiplication of the code and carrier gives a 12-bit number. This 12-bit number has its lower 2 bits truncated to give a 10-bit output. This procedure is performed to increase the fidelity of the multiplication process.

The digital data from the data source 410 is a stream of ones and zeroes. If the value of the data bit is one, then the 10-bit digital chaotic signal is not modified. However, if the value of the data bit is zero, then the 10-bit digital chaotic code-carrier signal is multiplied by −1.

In the example implementation, the DAC 414 is a 10-bit, 100 MSPS capable device. The DAC 414 receives as input the system clock of 52.0833 MHz and the 10-bit digital chaotic signal described above. The IF amplifier 416 conditions the signal output by the DAC 414 to drive the upconverting mixer

418. The RF generator 420 outputs a frequency of 1.9375 GHz to the upconverting mixer 418. The upconverting mixer 418 receives the output analog chaotic signal from the DAC 414 which is centered at a 15 MHz analog frequency and mixes it with the 1937.5 MHz sinusoidal signal from the RF generator 420 to produce two versions of the chaotic signal—the first is a high-side upconvert, giving an output frequency of 1922.5 MHz and the second is the low-side upconvert frequency of 1952.5 GHz. Both versions of the chaotic signal are provided to image reject filter 422. The image reject filter 422 is a passive filter that suppresses the higher image frequency and passes the desired upconverted signal to an antenna, which transmits the upconverted chaotic signal in the L-band.

Figure 5:
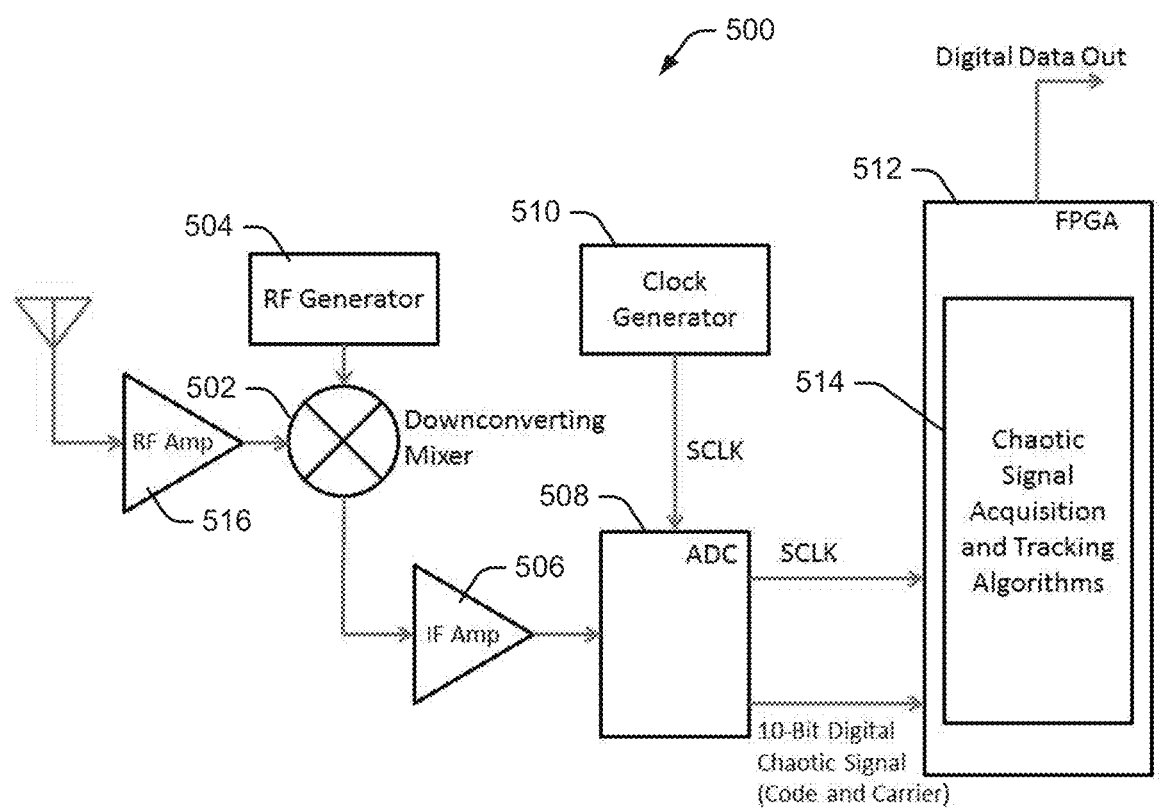
FIG. 5 is a block diagram of a chaotic signal receiving system in accordance with an embodiment.

FIG. 5 is a block diagram of a chaotic signal receiving system 500 in accordance with an embodiment. In the embodiment of FIG. 5, an RF amplifier 516 receives a chaotic signal from an antenna and amplifies the chaotic signal in the RF band prior to downconversion. A downconverting mixer 502 receives the amplified signal from the RF amplifier and receives an RF signal from an RF generator 504. The downconverting mixer 502 is coupled to an IF amplifier 506, which is coupled to an ADC (analog-to-digital converter) 508. The ADC 508 receives a master clock signal from a clock generator 510. Two output signals are provided from the ADC 508 to a FPGA 512: the master clock signal (generated by the clock generator 510) and a 10-bit digital chaotic signal. The FPGA 512 includes one or more chaotic signal acquisition and tracking algorithms 514 that extract a digital data signal from the 10-bit digital chaotic signal.

An example implementation of the chaotic signal receiving system 500 communicates wirelessly in the L-band (950-1950 MHz). In this example implementation, the RF generator 504 drives one of the two inputs of the downconverting mixer 502, which is used to mix the input RF signal at 1922.5 MHz with the locally generated 1731.25 MHz signal to get a downconverted baseband center frequency of 191.25 MHz. The IF amplifier 506 provides the necessary amplification to the downconverted signal in order to drive the ADC 508. The clock generator 510 generates the master clock for the chaotic signal receiving system 500. In this particular example, the master clock has a frequency of 52.0833 MHz, which is the same as the chaotic signal transmitting system 400 discussed above.

The ADC 508 is used to digitize the chaotic signal at baseband for digital processing by the FPGA 512. The ADC outputs the 52.0833 MHz clock along with the 10-bit digitized chaotic data to the FPGA 512. The FPGA 512 executes the acquisition and tracking algorithms in real-time, and demodulates the chaotic signal to generate the digital data output.

The design of the chaotic digital communication system is based on a chaotic spreading sequence that is generated by an a priori generated data file that is programmed into the FPGA itself. The discrete-time chaotic function used in some embodiments is based on the cubic map, given by the discrete-time recursive equation:

$$x_{k+1} = 4x_k^3 - 3x_k, \quad (1)$$

where different initial conditions $x_0$ give different chaotic time ensembles, where $|x_0|<1$. An alternative to the algebraic equation (1) is to represent this cubic map by a trigonometric equation, where, by substituting:

$$x_n = \cos \phi_n, \quad (2)$$

and then applying the triple angle formula, the result is:

$$x_{n+1} = \cos \phi_{n+1} = 4 \cos^3 \phi_n - 3 \cos \phi_n = \cos 3\phi_n. \quad (3)$$

Then, the equation for the cubic map can be expressed by the following trigonometric equation:

$$\cos \phi_{n+1} = \cos 3\phi_n, \quad (4)$$

which can be written as a recursion based on an initial value of $\phi$ at n=0 as:

$$\cos \phi_n = \cos 3^n \phi_0. \quad (5)$$

Thus, the sequence $\{\cos \phi_n\} = \{\cos 3^n \phi_0\}$, for some $\phi_0$ forms the basis for a discrete-time trigonometric chaotic sequence generator. Further, by changing the multiplier on the angle from 3 to other values such as 5, 7 and so on gives additional functions (maps) that can be used to generate chaotic time sequences in discrete-time. These properties of trigonometric chaotic generating functions are used as the basis for the fixed-point chaotic sequence generating algorithm discussed below Fixed-Point Discrete-Time Chaotic Sequence Generator Using the CORDIC Block From a computational perspective, the equations discussed above that are used to generate the chaotic time series use floating-point arithmetic to perform the computations. One embodiment of the discrete-time chaotic generator using floating point processing is accomplished by using an embedded processor on an FPGA. In alternate embodiments, the trigonometric chaotic generating function can be modified to work in a fixed-point (FPGA) environment, using the CORDIC block.

Figure 6:
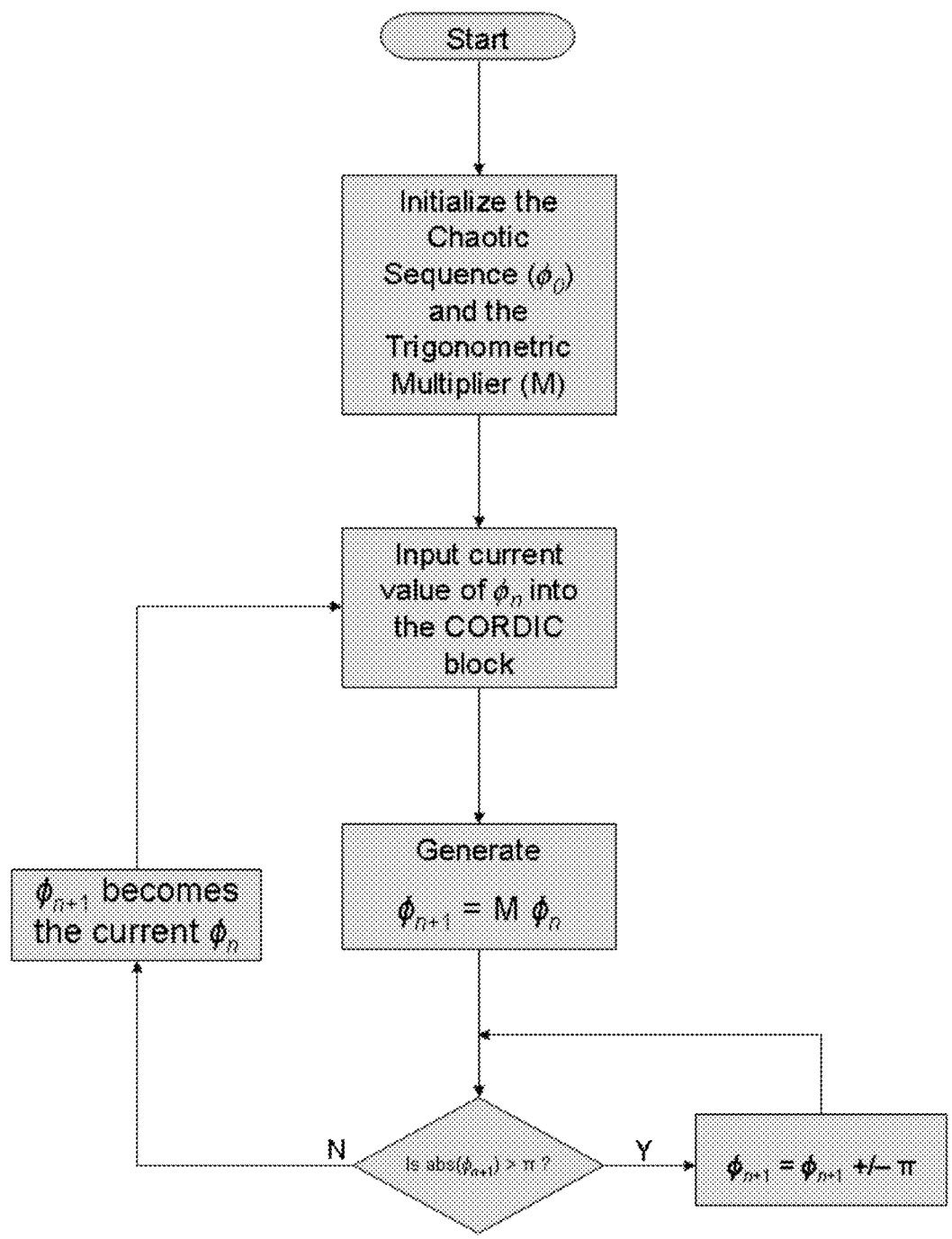
FIG. 6 is a flow diagram of a method, in accordance with an embodiment, for generating a chaotic sequence in fixed-point arithmetic using a CORDIC block.

In some embodiments, computation is performed in fixed point; the input angle as well as the output cosine function are in FixN_Q format. In order to generate the chaotic sequence, there are two parameters chosen: an initial condition and a trigonometric multiplier (equal to 3 for the cubic map). Then, at each iteration, the initial condition is recursively multiplied by the trigonometric multiplying factor which is then input to the CORDIC block. The time series output of the CORDIC block is the discrete-time chaotic sequence. By clocking the CORDIC block at a fraction of the master system clock (e.g., at a quarter rate), the sample-and-hold algorithm can be implemented, yielding the CDSS-SH (Chaotic Direct-sequence Spread Spectrum—Sample and Hold) chaotic sequence, which takes advantage of the early-late-prompt discriminator function in order to implement the chaotic code tracking loop. While implementing the chaotic sequence generator in fixed-point, the recursive multiplication by the trigonometric multiplier results in the value of the input to the CORDIC block growing with time. This can be a problem for both fixed and floating point implementations. In order to work around this, the input angle is constrained to be in the interval $(-\pi, \pi)$, and if the angle increases or decreases to a value that lies outside this interval, the value of it in the appropriate FixN_Q format is subtracted or added from the angle (depending on the sign) until the angle lies within the required interval. FIG. 6 is a flow diagram of this example method for generating a chaotic sequence in fixed-point arithmetic using a CORDIC block.

The systems and methods discussed herein generate discrete-time chaotic signals using fixed-point representation in devices such as FPGAs. The advantage of generating chaotic sequences in this manner allows for greater flexibility as compared to the generation of such sequences based on text files that are loaded into the FPGA at program time. Also, it is possible that the fixed-point arithmetic implementation of these chaotic sequence generators will be faster and less complex than the corresponding implementations in floating-point arithmetic. The dyad formed by the initial phase angle and the trigonometric multiplier as initialization variables can also allow for the reconfiguration and reprogramming of such chaotic generators in the field, and also allow for "rolling codes" that allow the chaotic sequence generator to be reinitialized with a new code each time the system is turned on. This allows for greater security and immunity from eavesdropping. Increasing the bit resolution on both the input and the output of the chaotic generation block allows for greater cipher strength and reduced probability of interception and detection, while also giving a larger ensemble of signals that can be generated using this technique. Due to the finite-precision offered by the fixed-point format, the number of points that can be generated by such chaotic generators is ultimately limited, and the chaotic sequences can exhibit periodicities. The same is true for sequences generated using floating point processing, only that the time period of the corresponding orbits are much longer. For finite-length chaotic slices used as spreading sequences this is not a limitation, as different uncorrelated slices from the same chaotic sequence can be used for different receivers. Similarly, different trigonometric configurations of the CORDIC block in the FPGA (i.e., sine and tangent function generators) can be used to generate discrete-time chaotic sequences.

Example Chaotic Digital High-Speed Data Communication System

Certain systems and methods described herein use a single chaotic spreading code sequence that is sampled and quantized. This slice of chaotic code is periodically repeated on a continuous basis, and the digital data to be transmitted modulates the sign of the chaotic spreading sequence. This system, originally configured to transmit digital data at a rate of 125 kbps, is currently configured to transmit data at a rate of 694 kbps. The technique used to increase the data rate, i.e. by reducing the number of samples per code chip along with decreasing the length of the integrate-and-dump sequence (thereby decreasing the repetition period of the chaotic sequence slice), is limited in the fact that the spreading sequence length cannot be arbitrarily decreased to a small value without severely compromising the security features of the system while also greatly increasing the probability of data bit errors. Although a sample rate increase can be used to increase the data rate, there is also an upper limit to how much the sample rate can be increased while keeping practical considerations like system size, power consumption and weight in mind.

In order to work around these shortcomings, the following technique is presented that allows for an increase in the data rate while maintaining a reasonable limit on system resources. This technique involves the use of two coexistent chaotic code spreading sequences. The first is a pilot code sequence, which is acquired and tracked in a conventional manner. The data modulation technique, i.e. BPSK, can be introduced on this pilot code sequence, which allows it to carry additional information. The second coexisting code sequence is one out of a bank of N distinct chaotic code sequences. In the simplest realization of the system, each sequence out of this bank is mapped to a binary symbol (which translates to a binary data word of appropriate length), and depending on the input data word, the appropriate code sequence (referred to herein as the auxiliary chaotic code sequence) is selected and transmitted along with the pilot chaotic code sequence. At the receiver, a standard set of code and carrier tracking loops decode and track the pilot code sequence. At the same time, a complete set of replica sequences that are the same as the auxiliary code sequences are simultaneously integrated-and-dumped with the input signal, and the signal with the largest integrate-and-dump value corresponds to the transmitted auxiliary code sequence. The successful detection of this auxiliary code sequence allows the receiver to appropriately select the corresponding binary data word for output. Additional variations in this technique further allow for the increase in the data rate, as discussed herein. This data communication technique is referred to herein as Chaotic Code Multiplexing (ChCM).

Figure 7:
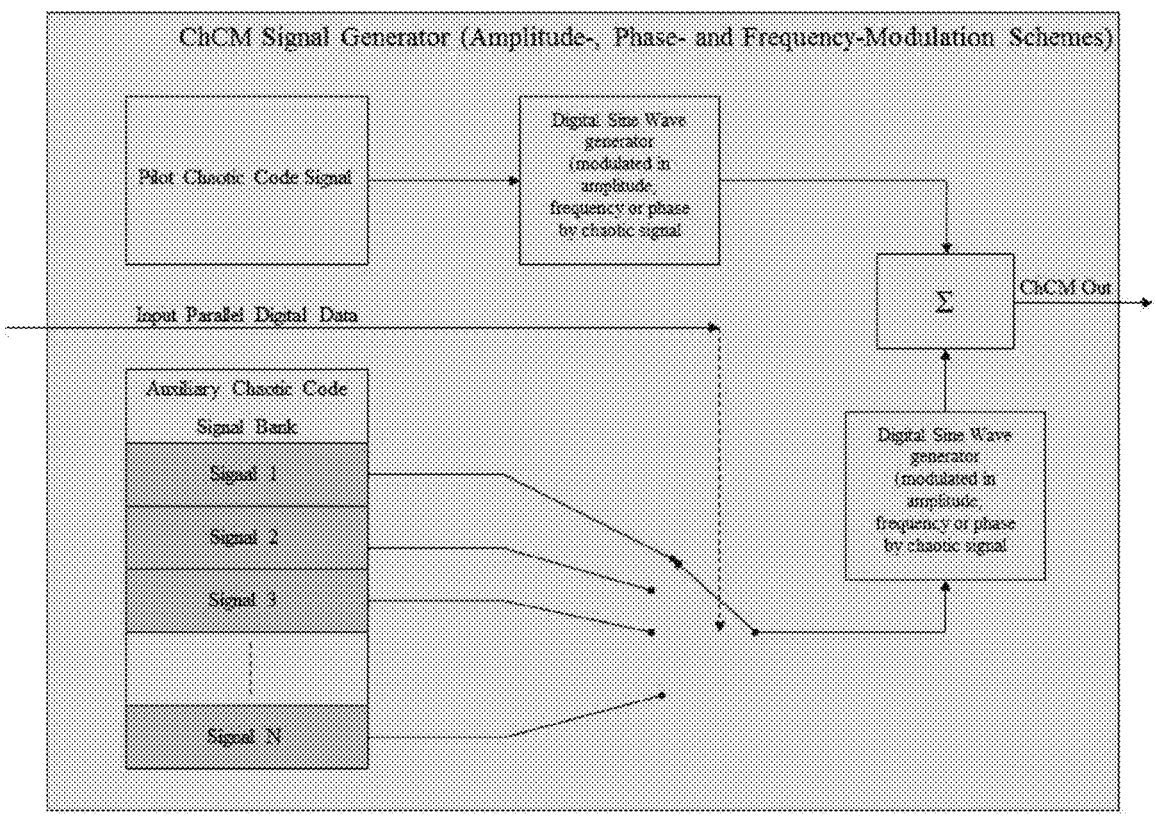
FIG. 7 is a block diagram of a ChCM (Chaotic Code Multiplexing) signal generator in accordance with an embodiment.

The basic ChCM signal is constructed using the correlation properties of chaotic signals. These signals have strong auto-correlation properties and weak cross-correlations. Thus, it is possible for multiple chaotic signals to coexist on the same bandwidth with minimum interference with each other. The ChCM signal is derived as a summation of two signals: a pilot chaotic code signal and an auxiliary chaotic code signal selected from a bank of N distinct candidate signals. Each signal can be independently correlated with its replica at the receiver with minimal interference. In some embodiments, both signals are slices of chaotic signals of equal length and repetition period. The pilot chaotic code is thus a fixed signal that does not change, while the auxiliary chaotic code is variable and depends on the input digital data word. FIG. 7 illustrates an example of a block diagram of a ChCM signal generator.

The pilot chaotic code signal as well as the multiplexed auxiliary chaotic signals in the respective bank are shown in FIG. 7. In a particular example, there are N auxiliary chaotic signals in the bank, where N, for convenience, is selected to be a power of 2, such as:

$$N=2^M, \quad (6)$$

where M is an integer number. Now, from binary arithmetic, this bank of N signals can uniquely support the entire number set represented by the M-bit wide binary word. In other words, each auxiliary chaotic sequence is mapped to a M-bit binary symbol. For example, if N=32, then the complete number set corresponding to 5-bit binary words can be completely represented by this set of N codes: signal 1 represents the binary word 00000, signal 2 represents the binary word 00001, and so on, until the signal 32 represents the binary word 11111. If the basic data rate supported by the basic system that uses only the pilot chaotic code sequence is D, then the ChCM system allows for a net data rate of MD. For example, for a 125 kbps system, using a 32-signal bank increases the data rate by a factor of 5, to 625 kbps. Using larger banks of distinct chaotic signals will allow further multiplicative increases in data rates.

Figure 8:
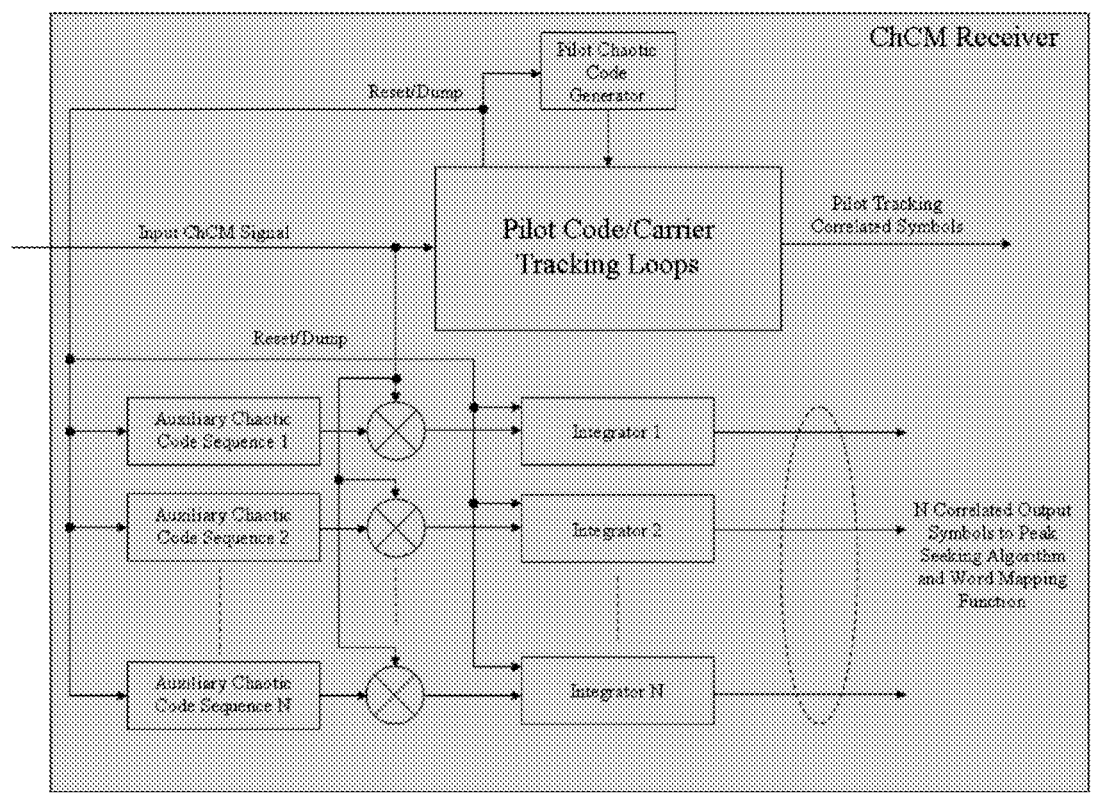
FIG. 8 illustrates an example of the code tracking portion of a ChCM receiver in accordance with an embodiment.

FIG. 8 illustrates an example of the code tracking portion of a ChCM receiver in accordance with an embodiment. The ChCM receiver of FIG. 8 is derived from the basic CDSS (Chaotic Direct-sequence Spread Spectrum) receiver. The basic acquisition and code/carrier tracking loops function in the same way for the pilot chaotic code sequence. Once acquisition is complete and the locally generated pilot code is synchronized with the incoming signal, a second set of N parallel integrate-and-dump loops simultaneously correlate the input signal with each of the signals in the auxiliary chaotic signal bank. The output of the N integrate-and-dump blocks are evaluated at the end of every integrate-and-dump interval. Due to the correlation properties of chaotic signals and the fact that the transmitted chaotic signals are phase-aligned and have the same time-period, only the auxiliary chaotic signal that is present in the received waveform will produce a large value at the output of the respective integrate-and-dump block, while other blocks will show small values. Thus, a peak-seeking algorithm can be used to determine which output is the maximum, and upon finding the maximum peak in the output sequence, the corresponding M-bit binary word can be mapped to the output.

Modified ChCM Communication System for Higher Data Rates

Figure 9:
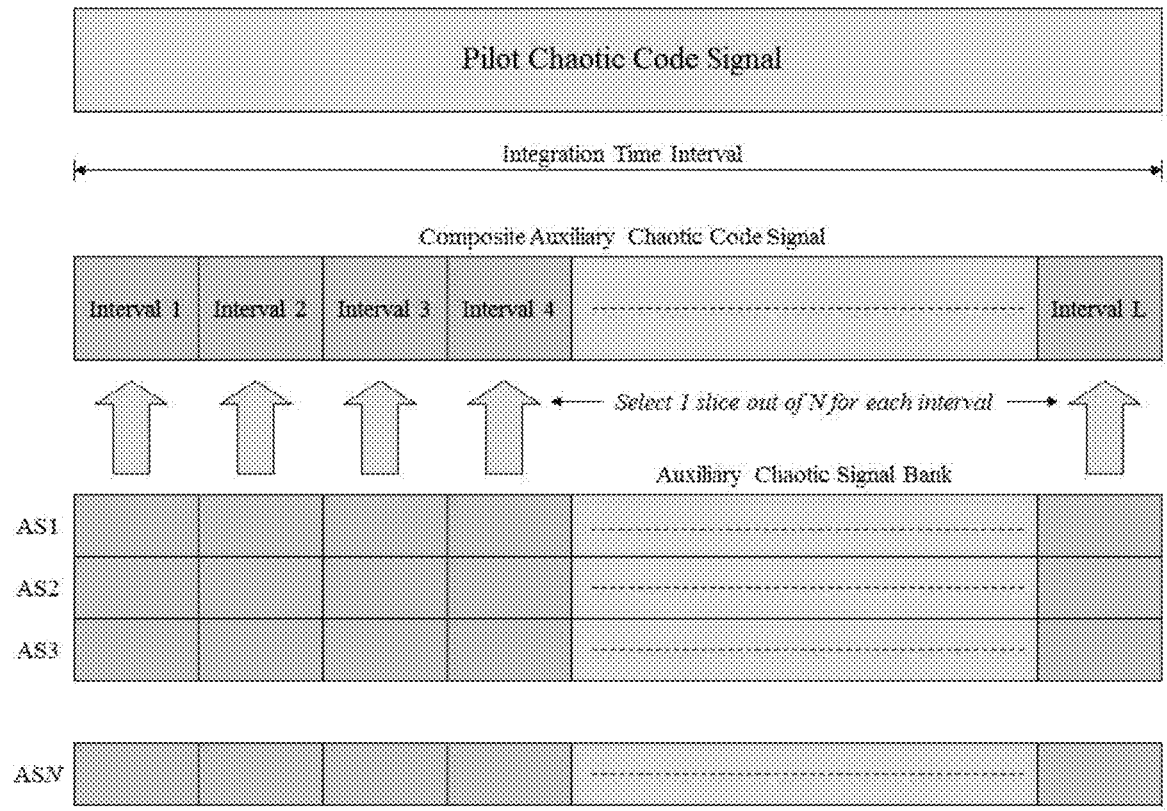
FIG. 9 is a signal composition diagram for a modified ChCM system in accordance with an embodiment.

FIG. 9 is a signal composition diagram for a modified ChCM system in accordance with an embodiment. The following embodiment allows for higher data rates from the ChCM system without needing a large number of auxiliary code sequences. This enhancement utilizes the temporal characteristics of chaotic signals to design a modified transmitter/receiver structure as described below.

The modified ChCM signal structure is still based on the combination of multiplexed auxiliary code signals and a pilot chaotic code sequence. The pilot chaotic code sequence in this modified design is unchanged from the basic system—it is the multiplexing of the auxiliary chaotic signals that is modified. In this embodiment, the time period of the pilot signal (which is also the time period for the integrate-and-dump routine) is divided into L equal partitions. During the time interval corresponding to each partition, a slice of any one of the N auxiliary code sequences is inserted into the output stream, and the combination of slices inserted into the output stream depends on the input binary word. Thus, in each of the L intervals, there are N possible code slices that can be inserted, giving a total of $N^L$ combinations of output auxiliary chaotic code sequences. As before, if N is a power of 2, then from equation (6), the widest binary word that can be supported by the system has a width $$W=\log_2(N^L)=L\log_2(2^M)=LM. \quad (7)$$

Thus, the division of the interval into L intervals increases the data rate of the basic ChCM system described above by a factor of L.

In a particular example, let N=2 (i.e. two auxiliary chaotic code sequences) and let L=5. For the simplest ChCM system, two symbols can be transmitted using this example: either a 1 or a 0, for an equivalent word width of 1 bit (i.e., M=1). If L=5 intervals are introduced and in each interval, then it is seen that in each interval, there are two possibilities—either a slice of the auxiliary chaotic signal 1 is introduced or a slice of the auxiliary chaotic signal 2 is introduced. For five intervals, the total number of combinations are 2*2*2*2*2=32 possibilities, giving a word width of $\log_2 2^5$=5 bits=LM. This auxiliary signal that is composed of a combination of slices of independent auxiliary chaotic sequences is combined with the pilot signal and transmitted.

Figure 10:
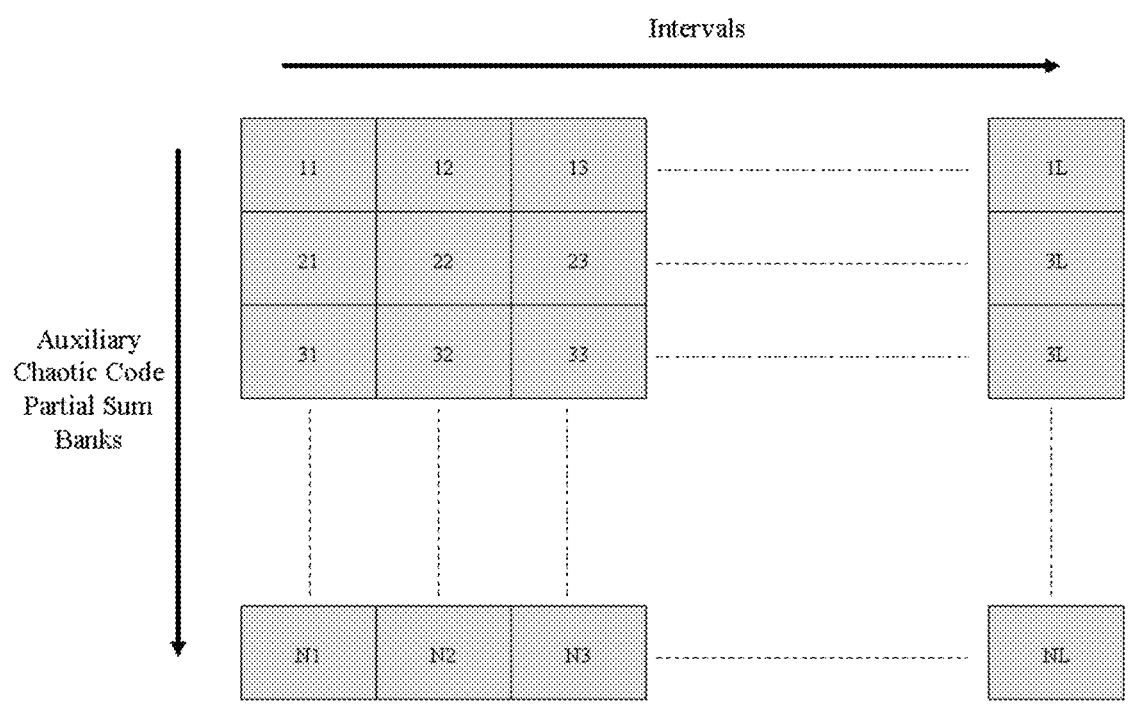
FIG. 10 illustrates an example matrix showing ChCM intervals and partial sums in accordance with an embodiment.

The complexities introduced into the modified ChCM signal structure are also reflected in the receiver. However, the resulting system is less complex for a given bit rate than the simplest ChCM receiver design, which would require a larger number of auxiliary chaotic code sequences. The basic structure of the ChCM receiver remains the same, with the same bank of auxiliary chaotic code sequences. As before, the pilot chaotic code sequence is independently tracked by a separate set of tracking loops, while the input chaotic signal is point-wise multiplied by each of the auxiliary chaotic signals from the signal bank. The main difference between the two systems is in the way the integrate-and-dump values are processed. After every time interval T/L, where T is the period of the pilot and the auxiliary code signals, the values of each of the integrators (partial sum) is stored in a separate register, and the integrators are reset. Although the integrators are reset, the chaotic code generators are not reset, and are allowed to run until the end of the interval T. At the end of each interval T, there are LN registers containing partial correlations of the input signal with slices of length T/L of all the auxiliary codes. By grouping the partial sums from the integrators from the same time interval into a separate bank, there are L banks of partial sums as shown in a matrix form in FIG. 10. If the dyad ij denotes the cells in FIG. 10, then i corresponds to the partial sum corresponding to the $i^{th}$ auxiliary chaotic code sequence, and j corresponds to the $j^{th}$ interval. Using different combinations of these partial sums provides different correlation values. Specifically, different combinations of L entries from this matrix are taken, one from each column, exhausting all possible combinations for all N auxiliary chaotic code sequences. Examples of different possible combinations for a case with four intervals and two auxiliary chaotic code sequences are:

(11, 12, 13, 14),
(11, 12, 13, 24),
(11, 12, 13, 34),
(21, 32, 43, 14), and so on. Each combination of four values is added together to give a correlation value. If the sequence of partial sums matches the code sequence on the received auxiliary chaotic code signal, then that correlation value will be the maximum value. In this example, if the received auxiliary chaotic code signal corresponds to the sequence (11, 12, 13, 14), then maximum correlation occurs for the corresponding locally generated code, and the described systems and methods detect the presence of this sequence.

Although a peak-seeking algorithm will be able to determine the maximum peak, the described systems and methods consider the fact that there will also be smaller peaks corresponding to partial correlations. Thus, for the above received sequence, the partial sum sequence, such as (11, 12, 13, 24), at the receiver will also produce a value that is approximately 75% of the peak value. On the other hand, a sequence such as (21, 22, 23, 34) at the receiver will produce a very small (i.e., uncorrelated) value.

Modified ChCM Receiver Algorithm

As discussed above, at the end of each full integrate-and-dump routine, all different combinations of partial sums based on selections from each column are to be added. For N auxiliary chaotic code sequences and L intervals, there are N possible selections from each column, which gives NL combinations of sums (of L values each) that are to be implemented. One technique is to "brute force" implement all such additions. An alternate technique, discussed below, reduces the number of additions required by the algorithm. This alternate algorithm reduces the sums of length L into smaller summations computed on-the-fly as the partial sums from the integrate-and-dump routine are computed. For example, consider a simple example with N=2 and L=3. To compute all possible relevant combinations of partial sums without optimization, it would require 8 addition combinations in total, each of 3 elements, giving a total of 16 addition operations. To optimize the computation of the correlation peak, it is noted that the total integration routine is composed of three smaller integrations. The first integration routine provides two partial sums, referred to as $S_{11}$ and $S_{12}$. Similarly, the second integration routine provides two more partial sums, referred to as $S_{21}$ and $S_{22}$. These sums are combined in the following manner to get the following sums:

$$S_{111}=S_{11}+S_{21},$$

$$S_{112}=S_{11}+S_{22},$$

$$S_{211}=S_{21}+S_{12},$$

$$S_{212}=S_{21}+S_{22}.$$

These four sums are further combined with the results from the third integration routine, $S_{31}$ and $S_{32}$, in the following manner:

$$S_{1111} = S_{111} + S_{31},$$

$$S_{1112} = S_{111} + S_{32},$$

$$S_{1121} = S_{112} + S_{31},$$

$$S_{1122} = S_{112} + S_{32},$$

$$S_{2111} = S_{211} + S_{31},$$

$$S_{2112} = S_{211} + S_{32},$$

$$S_{2211} = S_{212} + S_{31},$$

$$S_{2212} = S_{212} + S_{32}.$$

Figure 11:
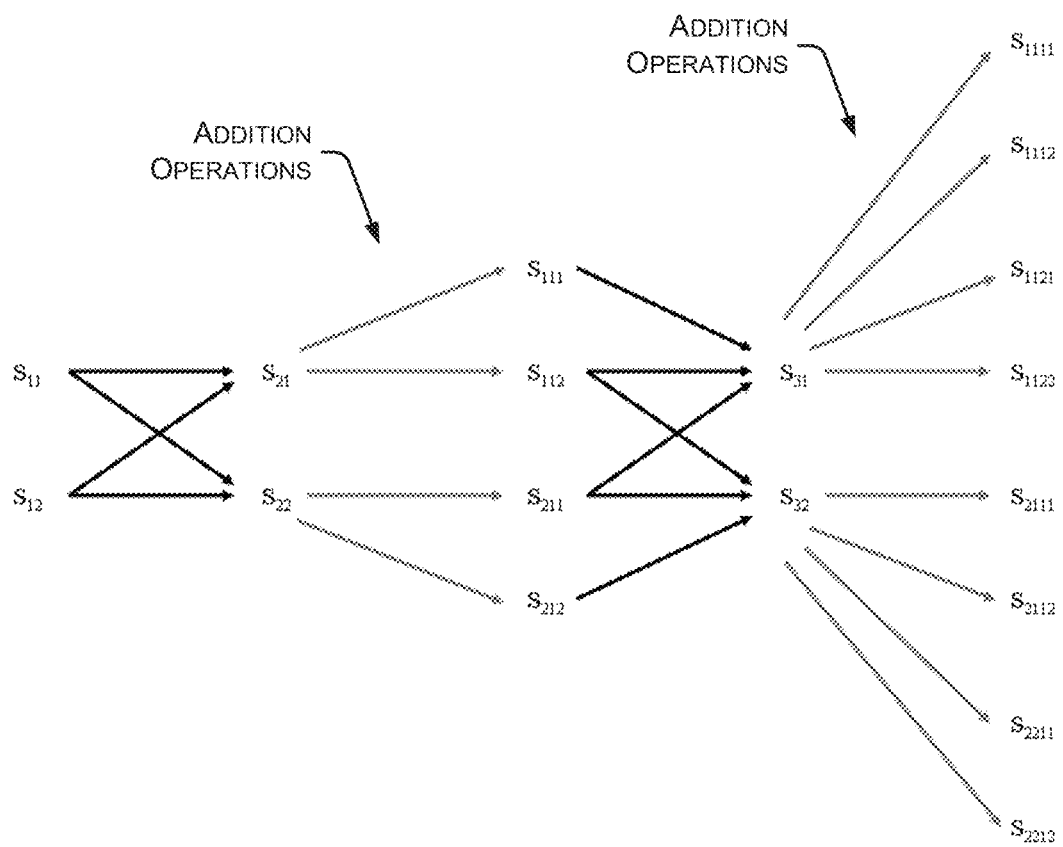
FIG. 11 illustrates an example addition algorithm used in a modified ChCM system in accordance with an embodiment.

The eight signals computed above are then evaluated by the peak-seeking algorithm, and the largest-valued signal is taken as the corresponding chaotic sequence in the received chaotic signal. If intermediate values are computed continuously, the total number of additions are reduced. In this case, only 12 addition operations are necessary, reduced from 16 operations as discussed above. More complex signal structures (i.e., larger values of N and L) will allow for a greater reduction in the number of adders required, thereby resulting in reduced system complexity. Additionally, the breaking down of the single addition operations in the non-optimized algorithm into several cascaded addition operations does not introduce latency into the system. In the former case, all additions are computed at the end of the main integrate-and-dump routine, while in the latter case, the additions are computed continuously, culminating at the end of the main integration routine. Thus, both processes end at the same time, with the former process being a one-step process at the end of the main integration routine and the latter process being a continuous flow through the main integration routine. FIG. 11 illustrates the above-described example addition algorithm used in a modified ChCM system. The example of FIG. 11 shows a total of 12 addition operations.

Additional Enhancements to the ChCM Algorithm

In some embodiments, additional enhancements are made to the ChCM algorithm that help increase the data rate while introducing different levels of complexity into the system. A few example enhancements are discussed below.

BPSK Enhancement

In some chaotic digital communication systems, a BPSK (binary phase-shift keying) data stream is used to modulate the sign of the chaotic signal. At the receiver, the polarity of the correlated symbol gives the value of the data bit (1 or 0). Similarly, in the modified ChCM algorithm, BPSK modulation can be added on both the pilot chaotic code signal as well as the auxiliary chaotic code signals. The decoding of the data bit on the pilot chaotic code is done using a standard method for chaotic demodulation. In the case of the auxiliary chaotic signal, the partial sums are computed and recombined as before. The only additional steps required before invoking the peak seeking routine are: 1) determine the sign of the correlated symbol (positive or negative), and 2) compute the absolute value of all the correlations whose values are negative. Then, when the sequence with the largest correlation is computed based on the absolute (positive) values of all the sequences, the sign of that sequence computed in step (1) adds an additional bit to the width of the binary output word. Thus, introducing BPSK modulation to the pilot and auxiliary chaotic codes allows for an addition of a total of two more bits to the binary word width, with a minimal increase in system complexity.

Generalized Code Slice Insertion Modification

In the enhanced ChCM system discussed herein (e.g., FIG. 9), the slice of code inserted into a particular time interval was selected from a particular bank of signals. Thus, as shown FIG. 9, the chaotic slice for the $i^{th}$ interval is selected only from the $i^{th}$ column in the auxiliary signal bank. This algorithm can be generalized further by allowing the insertion of a chaotic slice from any column into any interval. This allows increasing the number of code sequence combinations from $N^L$ to $(NL)^L$. Once again, if $N=2^M$, then the width of the binary word is $\log_2((2^M L)^L) = L \log_2 L + ML$. For convenience, set $L=2^K$, so that the expression for the binary word width is equal to $L(K+M)$, where L is left in its original form as a multiplication factor. In this way, the bit rate can be increased further, with the tradeoff being an increase in system complexity. The transmitter will have to have a modified architecture to insert the chaotic sequences from different intervals into a current interval, while the receiver will have to run more parallel integrate-and-dump routines to account for the selection of additional sequences present in each interval.

Using Multiple Auxiliary Chaotic Code Sequences

Another way to increase the data rate of the ChCM system is to use more than one auxiliary chaotic code sequence simultaneously along with the pilot chaotic code sequence. In other words, the pilot chaotic code sequence is transmitted along with two or more auxiliary chaotic code sequences. Then, if there are N auxiliary chaotic code sequences in the bank, out of which n auxiliary chaotic code sequences are transmitted at each time, then even without the multiple interval partitioning, this gives $C^N_n$ combinations of auxiliary chaotic code sequences, where $$C^N_n = N!/(N-n)!n!$$

For example, if there are four auxiliary chaotic code sequences (N=4), and two sequences are transmitted at one time, this gives 12 possible combinations of binary words. At the receiver, the two maximum signal peaks are selected, which is mapped to the appropriate binary word. By increasing the number of auxiliary chaotic code sequences that are simultaneously transmitted, the effective binary word width can be increased. There is, however, an upper limit to how many chaotic code sequences can be simultaneously accommodated in a given bandwidth, since, after a certain point, the chaotic code sequences start interfering with one another if the number of coexisting code sequences is high.

The techniques of multiple intervals discussed above can also be amalgamated with this technique of multiple chaotic code sequences to achieve further increases in the effective bit width. For example, consider the simplest case of L intervals where each interval is filled by n slices of chaotic signals from the same column in FIG. 9 (n<N). In this example, each interval can be filled in $C^N_n$ ways, and for L intervals, producing (CV possible combinations, with $L \log_2(C^N_n)$ as the effective binary word width. The receiver architecture in this example is a modification of the architecture described previously, tailored to detect multiple correlation peaks.

Spread spectrum signals have the property that they can be used for the design of digital communication systems even when the spread spectrum signal is completely overwhelmed by noise. By carefully designing the spread spectrum signal integration interval, it is possible to recover a spread spectrum signal in extremely low signal-to-noise ratio environments. These systems have their limitations, however. For example, it is difficult to integrate beyond a certain time limit, due to the possibility of a digital data bit transition. This limitation is not seen with chaotic signals, as discussed below.

By way of example, consider a spread spectrum communication system that uses a binary spreading sequence that takes values of ±1. Assume that in the digital domain, there are N samples per integration period. Further, assume that the digital data is BPSK modulated, then it is well-known that such a system cannot integrate beyond N samples. If the signal-to-noise ratio degrades sufficiently, then integration up to N samples might not be sufficient to extract the spread-spectrum signal from the noise floor, which results in a loss of the communication link.

Chaotic communication systems circumvent this problem by being able to track in extremely low signal-to-noise environments by arbitrarily increasing the integration time. While the BPSK digital data is lost in this process, ChCM techniques can be used to encode digital data into the communication link. For example, consider a chaotic signal at the output of the ADC at a chaotic signal receiver:

$$s_{c_k} = d_{i_N} c_k \sin(\omega k)$$

where $d_{i_N} = \pm 1$ is the binary digital data that is held constant during each integration interval of length N, $\omega$ is the digitized carrier angular frequency, $c_k$ is the chaotic spreading sequence, and k is the discrete-time index. (Note that if binary spreading sequences were used instead of chaotic spreading sequences, then the system would use $c_k = \pm 1$.) For the chaotic communication signal described above, suppose the signal-to-noise ratio drops drastically, to the point where a single integrate-and-dump period, N, is insufficient to acquire and track. Under normal circumstances, the system would break down, rendering the communication link fractured. Further, the integration time can typically not be increased beyond N in the presence of the binary data bit for this class of systems (including binary spread-spectrum systems). In other words, integrating beyond a single bit interval is not an option for contemporary spread-spectrum systems, since the correlation peak will not be consistent due to the potential change in the polarity of the data bit $d_{i_N} = \pm 1$.

As a salient feature of chaotic and non-binary communication systems, consider an approach to square the signal $s_{c_k}$ as follows:

$$s_{c_k}^2 = c_k^2 \sin^2(\omega k)$$

where the system considers the fact that $d_{i_N} = 1$. Now, the system can correlate this signal with a second sequence derived from the original chaotic sequence defined by:

$$\sigma_k \triangleq c_k^2$$

and thus:

$$s_{c_k}^2 = \frac{\sigma_k}{2}(1 - \cos(2\omega k))$$

Now that the binary data bit has been stripped off, the signal can be filtered to remove the low frequency chaotic component, and the system can attempt to acquire and track the composite chaotic signal:

$$\rho k = \frac{\sigma_k}{2} \cos(2\omega k)$$

with arbitrarily long correlation lengths, using the newly defined sequence $$\left\{\frac{\sigma_k}{2}\right\}$$

at twice the original carrier frequency. Thus, if the signal-to-noise ratio drops (for example, if a broadband jammer is active), then instead of abandoning the communication link, the integration length can be increased to get a stronger correlation peak by switching to the newly defined signal $\rho_k$ as defined above by (possibly digitally) squaring the received downconverted signal, and tracking can be continued, albeit at a much lower data rate. This is a "fail-safe" mode, where the system is still robust to noise and jamming. Data can still be sent and received at this lower rate, and the communication link is still active. For example, ChCM can now be used in this situation to send data across the link via a nonstandard protocol. When the signal-to-noise ratio improves, the system can go back to its regular mode of operation. In the fail-safe mode, squaring the input signal also squares the noise signal as well, and even longer integration lengths might be required to maintain correlations, but the preservation of the communication link is still possible. This represents a significant advantage of chaotic and non-binary spreading sequences over existing BPSK spreading sequences—the sequence $\rho_k$ cannot be constructed if binary spreading sequences are used, since the squaring of the signal strips off the binary spreading sequence.

These described systems and methods, coupled with the ChCM technique, can be used to transmit data even in severely degraded signal-to-noise environments. Alternatively, a system can be designed from the ground-up to take advantage of this property, operating below the noise floor in a covert manner as a secure, undetectable communication channel.

Particular examples discussed herein are related to chaotic waveforms. However, the systems and methods described herein are applicable to other types of spread spectrum waveforms, such as binary spread spectrum waveforms. Additionally, the systems and methods discussed above are related to chaotic amplitude modulation. In other embodiments, these systems and methods are applicable to chaotic frequency modulation and chaotic phase modulation, as discussed below.

In the example of chaotic phase modulation, the phase of the chaotic signal is modulated, as given by the following equation:

$$C_{PM_k} \triangleq \sin(\omega k + c_k + \phi)$$

The phase-modulated signal ($C_{PM}$) typically possesses better spectral characteristics as compared to an amplitude modulated signal. The receiver design for the phase-modulated signal uses a spread-spectrum receiver design methodology. In some embodiments, at the expense of a slightly poorer tracking signal-to-noise ratio, for the same chaotic waveform, the corresponding amplitude-modulated chaotic receiver can demodulate and decode the phase-modulated signal.

In other embodiments, a frequency-modulated chaotic signal is generated by directly modulating the frequency of a sinusoidal carrier. The modulation equation for the frequency-modulated chaotic frequency-hopping spread-spectrum (CFSS) signal is given by the following equation:

$$C_{FM_k} \triangleq \sin[(\omega + c_k)k + \phi]$$

In this embodiment, the receiver design for the frequency-modulated signal uses a spread-spectrum receiver design methodology to demodulate and decode the chaotic frequency-hopping spread-spectrum signal.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a chaotic waveform;
selecting a portion of the chaotic waveform wherein a length of the selected portion of the chaotic waveform is less than a length of the chaotic waveform;
receiving a data signal for communication to a destination; and
generating, using at least one signal generator, a chaotic data signal based on the received data signal, the chaotic data signal including the selected portion of the chaotic waveform inserted at periodic intervals based on the length of the selected portion of the chaotic waveform, wherein the generating of the chaotic data signal includes chaotic phase modulation, and wherein the selected portion of the chaotic waveform modulates the phase of a trigonometric function.

2. A method comprising:
receiving a chaotic waveform;
selecting a portion of the chaotic waveform wherein a length of the selected portion of the chaotic waveform is less than a length of the chaotic waveform;
receiving a data signal for communication to a destination; and
generating, using at least one signal generator, a chaotic data signal based on the received data signal, the chaotic data signal including the selected portion of the chaotic waveform inserted at periodic intervals based on the length of the selected portion of the chaotic waveform, wherein the generating of the chaotic data signal includes chaotic frequency modulation, and wherein the selected portion of the chaotic waveform modulates the frequency of a trigonometric function.

3. An apparatus comprising:
a chaotic waveform generator configured to generate a selected portion of a chaotic waveform, wherein a length of the selected portion of the chaotic waveform is less than a length of the chaotic waveform;
a signal generator coupled to receive a data signal from a data source and coupled to receive the selected portion of the chaotic waveform from the chaotic waveform generator, the signal generator configured to generate a chaotic data signal based on the received data signal and the selected portion of the chaotic waveform such that the chaotic data signal includes the selected portion of the chaotic waveform inserted at periodic intervals based on the length of the chaotic waveform; and
a transmitter coupled to the signal generator and configured to transmit the chaotic data signal to a destination device;
wherein the signal generator generates the chaotic data signal using chaotic phase modulation, and wherein the selected portion of the chaotic waveform is used by the signal generator to modulate the phase of a trigonometric function.

4. An apparatus comprising:
a chaotic waveform generator configured to generate a selected portion of a chaotic waveform, wherein a length of the selected portion of the chaotic waveform is less than a length of the chaotic waveform;
a signal generator coupled to receive a data signal from a data source and coupled to receive the selected portion of the chaotic waveform from the chaotic waveform generator, the signal generator configured to generate a chaotic data signal based on the received data signal and the selected portion of the chaotic waveform such that the chaotic data signal includes the selected portion of the chaotic waveform inserted at periodic intervals based on the length of the chaotic waveform; and
a transmitter coupled to the signal generator and configured to transmit the chaotic data signal to a destination device
wherein the signal generator generates the chaotic data signal using chaotic frequency modulation, and wherein the selected portion of the chaotic waveform is used by the signal generator to modulate the frequency of a trigonometric function.

* * * * *